(12) United States Patent
Koenning et al.

(10) Patent No.: US 11,657,275 B2
(45) Date of Patent: May 23, 2023

(54) METHOD AND SYSTEM FOR ADJUSTING A MACHINE LEARNING OUTPUT

(71) Applicant: SAP SE, Walldorf (DE)

(72) Inventors: Joerg Koenning, Munich (DE); Eduard-Andrei Boamba, Puchheim (DE); Ovidiu Boc, Munich (DE); Yuanxun Gu, Munich (DE); Yevgen Borodkin, Munich (DE)

(73) Assignee: SAP SE, Walldorf (DE)

( * ) Notice: Subject to any disclaimer, the term of this patent is extended or adjusted under 35 U.S.C. 154(b) by 486 days.

(21) Appl. No.: 16/833,878

(22) Filed: Mar. 30, 2020

(65) Prior Publication Data
US 2021/0279567 A1   Sep. 9, 2021

(30) Foreign Application Priority Data
Mar. 4, 2020  (EP) ..................................... 20160989

(51) Int. Cl.
  *G06F 17/18*  (2006.01)
  *G06N 3/08*   (2023.01)
  *G06N 3/10*   (2006.01)

(52) U.S. Cl.
  CPC ............... *G06N 3/08* (2013.01); *G06F 17/18* (2013.01); *G06N 3/10* (2013.01)

(58) Field of Classification Search
  CPC ............ G06N 3/08; G06N 3/10; G06F 17/18
  USPC ......................................................... 706/21
  See application file for complete search history.

(56) References Cited

U.S. PATENT DOCUMENTS

| | | | |
|---|---|---|---|
| 2007/0018601 A1* | 1/2007 | Steinbach | G06F 11/3476 318/568.11 |
| 2011/0071962 A1* | 3/2011 | Lim | G06N 5/048 706/46 |
| 2019/0034796 A1* | 1/2019 | Li | G06N 3/063 |

OTHER PUBLICATIONS

Monticelli (Electric Power System State Estimation, (21 pages)). (Year: 2000).*
Mjolsness et al. (Algebraic Transformations of Objective Functions, (43 pages)). (Year: 1994).*

(Continued)

*Primary Examiner* — Andre Pierre Louis
(74) *Attorney, Agent, or Firm* — Buckley, Maschoff & Talwalkar LLC (57) ABSTRACT

A computer-implemented method for obtaining a detection and/or a prediction about a state of a physical system is provided. The method comprises: retrieving an artificial neural network that processes a plurality of input values to provide one or more network output values; converting the artificial neural network into one or more mathematical functions, wherein each mathematical function maps the plurality of input values to a function value that coincides with one of the one or more network output values; applying at least one patch to at least one of the one or more mathematical functions, wherein the at least one patch comprises at least one mathematical expression that affects the function value of the at least one patched mathematical function; retrieving a plurality of state input values related to the physical system; computing one or more state function values by feeding the plurality of state input values to the one or more mathematical functions including the at least one patched mathematical function; obtaining the detection and/or prediction from the one or more state function values.

18 Claims, 5 Drawing Sheets

(56) References Cited

OTHER PUBLICATIONS

"Extended European Search Report", dated Oct. 9, 2020 (Oct. 9, 2020), European Patent Office, for European Application No. 20160989.8-1203, 10pgs.

"Extended European Search Report", dated Oct. 5, 2022 (Oct. 5, 2022), European Patent Office, for European Application No. 20160989.8-1203, 11 pgs.

Agostinelli Forest et al: "Learning Activation Functions to Improve Deep Neural Networks", , Apr. 21, 2015 (Apr. 21, 2015), XP055963996, Retrieved from the Internet: URL:https://arxiv.org/pdf/1412.6830.pdf [retrieved on Sep. 22, 2022].

Scienceasia. "Modelling a neural network using an algebraic method Samerkae Sumhom Cite this paper", Feb. 28, 2014 (Feb. 28, 2014), XP055963967, Retrieved from the Internet: URL:https://d1wqtxts1xzle?.cloudfront.net/70944686/d2dd204958731f0d3eeccdc317547b5a9413-with-cover-page-v2.pdf? Expires=1663859384&Signature= TFH0GZmk4VdG2ywtGIAmiCBapX5rwITVa Mm4MnZp~yQwEaCfdZfhQ4~F PEa1uc4GoBBH7xOpkUnUVEgSoFJRJrCJ3T JnP0y-~dWn P7 o4WU RTaM RCwMS~nvKq 1 MX5LV9m0eoyhu0wg92vbbW5jaet-sLRqsiSbQrXu58O [retrieved on Sep. 22, 2022].

Hecht-Nielsen Robert: "Scanned by CamScanner Kolmogorov's Mapping Neural Network Existence Theorem", Jun. 24, 1987 (Jun. 24, 1987), XP055963973, Retrieved from the Internet: URL:https://cs.uwaterloo.ca/~y328yu/classics/Hecht-Nielsen.pdf [retrieved on Sep. 22, 2022].

Mjolsness E et al: "Algebraic transformations of objective functions", Neural Networks, Elsevier Science Publishers, Barking, GB, vol. 3, No. 6, Jan. 1, 1990 (Jan. 1, 1990), pp. 651-669, XP024392982, ISSN: 0893-6080, DOI: 10.1016/0893-6080(90)90055-P [retrieved on Jan. 1, 1990].

\* cited by examiner

METHOD AND SYSTEM FOR ADJUSTING A MACHINE LEARNING OUTPUT

CROSS-REFERENCE TO RELATED APPLICATIONS

The present application claims priority under 35 U.S.C. § 119(a) to EP Patent Application No. 20160989.8, filed Mar. 4, 2020, the contents of which are incorporated herein by reference for all purposes.

DESCRIPTION

Technical Field

The following description relates to a method, a medium and a system for adjusting the output of a mathematical tool used for machine learning.

Background

Machine learning is widely used in order to perform a variety of tasks including image recognition, medical diagnosis and device diagnostics. In particular, artificial neural networks are used for machine learning.

An ANN is configured to process input data and provide a result based on these input data. Before an ANN is utilized, the ANN is extensively trained with training data that associate input data to an expected result. Usually the ANN is trained until the error rate, i.e. the normalized number of times the result given by the ANN is different from the expected result, falls below a given threshold and/or reaches a substantially stable value. In this way, the ANN "learns" how to correctly interpret the input data and its outcome is reliable.

Once the training phase is over, the ANN can be in principle used to perform the task for which it has been trained under different conditions. However, in some cases, the training data may not be sufficiently varied and the ANN may fail, i.e. provide a wrong result. Conventionally, the ANN needs to be trained again with more training data.

Re-training the ANN is a computationally expensive operation and it may need to be performed multiple times if the ANN is used under different conditions that were not accounted for during training. Further, in order to cover all possible use cases, the training data set may become too heterogeneous, leading to a decrease in the accuracy of the ANN.

In addition, the re-training of the ANN obviously causes a modification of the ANN. ANNs need to be certified according to specific regulations and the certification process is quite lengthy. Although the original ANN may have already been certified, the re-trained ANN needs to go through the certification procedure all over again.

Similar problems arise in connection with other techniques employed in machine learning, such as decision trees, matrices and vectors, hidden Markov models and so on.

SUMMARY

It is an object of the invention to efficiently and effectively adjust the result provided by a mathematical tool for machine learning under circumstances that would compromise the accuracy of the result without modifying the mathematical tool.

The achievement of this object in accordance with the invention is set out in the independent claims. Further developments of the invention are the subject matter of the dependent claims.

According to one aspect, a computer-implemented method for obtaining a detection and/or a prediction about a state of a physical system is provided. The method comprises:

- retrieving a mathematical tool for machine learning, wherein the mathematical tool processes a plurality of input values to provide one or more output values;
- converting the mathematical tool into one or more mathematical functions, wherein each mathematical function maps the plurality of input values to a function value that coincides with one of the one or more output values;
- applying at least one patch to at least one of the one or more mathematical functions, wherein the at least one patch comprises at least one mathematical expression that affects the function value of the at least one patched mathematical function;
- retrieving a plurality of state input values related to the physical system;
- computing one or more state function values by feeding the plurality of state input values to the one or more mathematical functions including the at least one patched mathematical function;
- obtaining the detection and/or prediction from the one or more state function values.

As mentioned above, machine learning has a wide variety of applications. The physical system may be anything for which machine learning can be employed. Exemplarily, the physical system may be a device or a component thereof, such as a battery, a wheel, a part of a textile machine. The physical system may be a digital object, such as a computer file (e.g. a bitmap image or a MP3 audio). The physical system may be a human being or a feature thereof, such as a vocal expression. In the following, reference may be made to an illustrative example in which the physical system is a binary image of a single digit, in order to facilitate comprehension of the invention.

The method provides a detection and/or a prediction about a state of the physical system. In particular, the physical system may be generally characterized by one or more possible features and the result obtained via the method may comprise an assessment based on and/or concerning the one or more features. This assessment may refer to the present state of the physical system and, thus, entail some sort of detection. Examples of detection may include, but are not limited to, face recognition, character recognition, mechanical wear evaluation, emotion detection in vocal expressions. Alternatively or additionally the assessment may refer to a future state of the physical system and, thus, constitute a prediction. Examples of prediction may include, but are not limited to, forecasting battery duration, prognosticating failure of a component, predicting a change in the state of the physical system. In the illustrative example, the result of the method may provide the detection of the digit in the binary image, namely the identification of which digit among the ten possible digits (from 0 to 9) is shown on the binary image.

In the following, reference will be made to an ANN as the mathematical tool. However, the method is similarly applied to other types of mathematical tools used for machine learning, such as decision trees, matrices, vectors, hidden Markov models, approximations etc.

The method comprises retrieving an ANN that processes a plurality of input values to provide one or more output values. The output values of an ANN are referred to as network output values. Retrieving the ANN may comprise receiving, by a first computing component from a second computing component, the ANN, e.g. through a secure network communication, for example using encryption. Alternatively or additionally, retrieving the ANN may comprise accessing a memory of a computing device in which the ANN is stored. In particular, the ANN may be stored after it has been received.

ANNs belong to the common knowledge of the skilled person, nevertheless a short overview will be given in the following. Generally, an ANN comprises a plurality of artificial neurones, wherein each neuron is a propagation function that receives one or more inputs and combines them to produce an output, wherein the inputs have different weights. For example, the propagation function may be a sigmoid, so that, for inputs $x_1, x_2, \ldots, x_n$ having respective weights $w_1, w_2, \ldots w_n$, the output of a neuron is $$\frac{1}{1+\exp\left(-\sum_{i=1}^{n} w_i x_i\right)}.$$

Optionally, the propagation function may include a bias term in the exponent of the exponential function.

The neurons in the ANN are organized in layers and the ANN comprises at least an input layer that receives a plurality of (initial) input values as external data and an output layer that generates one or more (final) output values. Optional layers between the input layer and output layer are called hidden layers, and the neurons in the hidden layers receive inputs from other neurons and provide the output to one or more other neurons. The ANN may have, at least initially, predetermined weights and biases. In the context of machine learning, the effect of training the ANN is an adjustment of the weights and, optionally, of the biases of the propagation functions of the single neurons.

In the illustrative example, the plurality of external input values may be values on a greyscale, with 0.0 representing white and 1.0 representing black. The number of input values may correspond to the number of pixels in the image.

The output layer may have one or more neurons and, thus, generate one or more network output values. The "one or more network output values" are the final output values of the ANN, i.e. the ones generated by the output layer neurons, and not the intermediate output values given by the input layer and the hidden layers. The output layer may have only one neuron, e.g. in cases in which the result is of a binary nature, such as yes/no, which could be the case for face recognition, for example. Alternatively, the output layer may have a plurality of neurons, each one providing a network output value. In the illustrative example, the ANN may have ten output neurons.

In particular, the retrieved ANN may be an ANN trained for providing the detection and/or prediction about the physical system.

The final result provided by the ANN, i.e. the one or more network output values, is a set of numerical values. In some cases, the one or more network output values directly provide the detection and/or prediction, e.g. if the detection and/or prediction consists in a numerical value and there is only one output node. In other cases, the one or more network output values per se may not provide the detection and/or prediction about the physical system, and may rather be interpreted on the basis of one or more predetermined criteria, which are usually specific to the ANN. Given the criteria, the network output values are what determines the detection and/or prediction. The network output value(s) could also be thought of as a "raw result" that needs to be construed into the desired information about the physical system.

For example, in the case of face recognition, if the task of the ANN is to determine whether an image shows a human face or not, the detection may be positive if the network output value of the output neuron is higher than a certain threshold, e.g. 0.5. Accordingly, the detection (e.g. "the image shows a human face") is determined by the network output value (e.g. 0.7).

In the illustrative example, the ten output neurons may be labelled corresponding to the ten digits and the network output values may be compared with one another to find the highest value. The result of the digit recognition may then be the digit corresponding to the neuron with the highest network output value. Also in this case the detection (e.g. "the image shows the digit 5") is determined by the network output values (e.g. a vector of values 0.2, 0.1, 0.3, 0.3, 0.1, 0.8, 0.5, 0.1, 0.3, 0.2 for the neurons labelled, respectively, "0", "1", "2", "3", "4", "5", "6", "7", "8", "9").

To summarize, the ANN is capable of processing input data to generate one or more network output values that are used to determine the detection and/or prediction about a physical system. The detection and/or prediction about the physical system may also be referred to as "result". An ANN is usually operated as a "black box", which means that the structure of the ANN (e.g. how many neurons, the values of the weights and biases . . . ) is not visible nor accessible to a user.

The ANN is retrieved in the form of at least one computer file, e.g. a configuration file or a source code file, wherein the computer file contains the information specifying the ANN, such as the weights, the number of layers and so on. The information may also be contained in a plurality of computer files. It should be noted that the method does not comprise compiling the source code and obtaining the result by using the ANN. Indeed, although the ANN may provide a result, the aim of the method is to tweak this result, at least under certain circumstances. As mentioned above, the ANN result may be wrong in some cases, e.g. if the training data were not varied enough or, in any case, did not account for some specific, unusual conditions of the physical system and/or around the physical system.

In the illustrative example, the samples of handwritten digits may originate e.g. only from right-handed people, so that, if the physical system is the image of a digit written by a left-handed person, the error rate may be consistently higher. In an example in which the physical system is a battery and the ANN provides a prediction about the time of discharge of the battery, the training data may refer to batteries in environments with e.g. temperature and humidity in given ranges. If the ANN is then used with input data referring to a battery located in a setting with values of temperature and humidity far out of those ranges, the prediction of the ANN may be off.

According to the method disclosed herein, the result that would be provided by employing the ANN is adjusted to correct possible "glitches" that may occur e.g. under specific circumstances. The result obtained by means of the method need not always be different from what the ANN result would be, but it is different in those cases in which the ANN would provide a wrong result. In other words, the error rate of the ANN is reduced without re-training the ANN or, generally, modifying the ANN, e.g. its weights and, optionally, biases.

The adjustment of the result is achieved by converting the ANN into one or more mathematical functions and applying one or more patches, as explained below.

The method comprises converting the ANN into one or more mathematical functions, wherein each mathematical function maps the plurality of input values to a function value that coincides with one of the one or more network output values. In other words, one mathematical function is generated for each network output value or output neuron. Accordingly, the number of mathematical functions coincides with the number of network output values provided by the ANN. If the ANN has only one output neuron, the ANN is converted into one mathematical functions. If the ANN has a plurality of output neurons, the ANN is converted into a corresponding plurality of mathematical functions. In the illustrative example, there may be ten mathematical functions $f_0$ to $f_9$, each corresponding to one output neuron, and, thus, each associated to a digit (see above).

Each mathematical function has as arguments input variables to which the input values of the ANN can be assigned. In the illustrative example, the input variables would be the greyscale of the pixels. Indeed, the pixels of an image of a digit may have different shades of grey, ranging from white to black. The white and black pixels may be the most useful in recognizing a digit.

The form of each mathematical function is such that, for a given set of input values, the value of the function coincides with one of the network output values of the ANN. In other words, each mathematical function is a composition of the functions of the single neurons all the way from the input layer to a specific output neuron.

Figure 1:
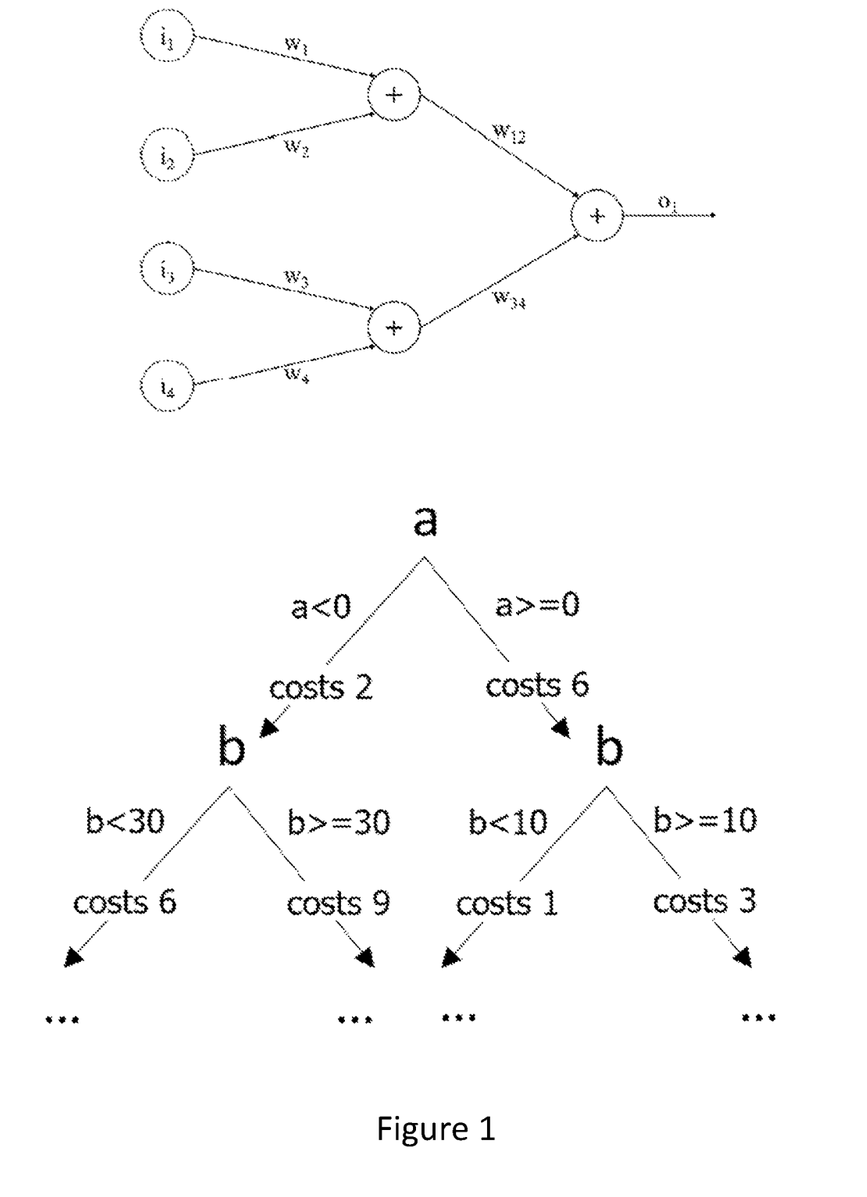
FIG. 1 shows a schematic representation of an artificial neural network and a schematic representation of a decision tree.

For example, if the ANN is a three-layer neural network with a single output neuron providing of as network output value as shown in the upper part of FIG. 1, the mathematical function $f_1$ converting the ANN is (for a sigmoidal propagation function)

$$f_1(i_1,i_2,i_3,i_4)=\{1+\exp[-w_{12}(1+\exp(-w_1i_1-w_2i_2))^{-1}-$$

$$w_{34}(1+\exp(-w_3i_3-w_4i_4))^{-1}]\}^{-1}=o_1$$

and, if the propagation function of the neurons is denoted with p and the intermediate results of the hidden layer are denoted with $m_1$ and $m_2$ respectively, it can be seen that the mathematical function is the composition of propagation functions:

$$f_1(i_1,i_2,i_3,i_4)=p(m_1,m_2)=p[p(i_1,i_2),p(i_3,i_4)]=o_1.$$

The above example can be, of course, generalized to an ANN with any number of hidden layers and any number of output neurons. When the ANN provides a plurality of network output values $o_1, o_2, \ldots, o_n$, the conversion yields a corresponding plurality of mathematical functions $f_1, f_2, \ldots, f_n$, each function tracing the path from the inputs to a specific, different output. The relation between the network output values and the functions is biunivocal.

In another example, if the mathematical tool is a decision tree as shown in the lower part of FIG. 1, the mathematical function obtained by converting the decision tree is:

$$f(a,b)=((a<0) \text{ AND } (b<30))*(2+6)+((a<0) \text{ AND } (b\geq30))*(2+9)+((a\leq0) \text{ AND } (b<10))*(6+1)+((a\geq0) \text{ AND } (b\geq30))*(6+3).$$

In yet another example in which the mathematical tool is a matrix multiplication involving variables, e.g.

$$\begin{pmatrix} x & 6 & 4 \\ 7 & y & -7 \\ -2 & z & 12 \end{pmatrix} * \begin{pmatrix} 7 & 8 & -2 \\ 9 & u & v \\ w & -18 & 3 \end{pmatrix},$$

the conversion would lead to a plurality of mathematical functions, a sample of which is as follows:

$$\begin{cases} c_{1,1}(x, y, z, u, v, w) = x*7 + 6*9 + 4*w \\ c_{1,2}(x, y, z, u, v, w) = x*8 + 6*u + 4*(-18) \\ \ldots \\ c_{3,3}(x, y, z, u, v, w) = (-2)*(-2) + z*v + 12*3 \end{cases}.$$

In a further example, the mathematical tool may be an approximation. A simple example for an approximation is a plot linking the pairs of measured values (1.5; 6), (2.5; 3) and (3.5; 25) with straight segments. The corresponding mathematical function would be $$f(x) = ((x \geq 1.5) \text{ AND } (x \leq 2.5)) * \left(\frac{3-6}{2.5-1.5}*(x-1.5)+6\right) +$$
$$((x > 2.5) \text{ AND } (x \leq 3.5)) * \left(\frac{25-3}{3.5-2.5}*(x-2.5)+3\right).$$

Coming back to the ANN example, converting the ANN into one or more mathematical functions means converting the computer file(s) of the ANN into a plain text file showing the mathematical functions in a human readable format. Specifically, converting the ANN comprises taking the computer file(s), extracting the mathematical functions from the computer file(s) and storing the one or more mathematical functions in plain text format. In particular, the mathematical functions may be extracted by executing a computer program that parses the one or more computer files specifying the ANN. The computer program may be a script, e.g. written in Python.

The result of each function, or function value, coincides with one of the network output values, so that the one or more function values of the one or more mathematical functions are the one or more network output values. This holds true when the ANN is converted, however at least one mathematical function may be then modified by a patch (see below), so that the resulting function value may possibly diverge from the network output value that the ANN would generate. Accordingly, the term "network output value" is used to indicate the value of the output of an output neuron in the ANN and the term "function value" is used to indicate the value of the output of one of the mathematical functions into which the ANN is converted. The set of network output values and the set of function values, given the same input values, coincide before any patches are applied. After one or more patches are applied, the two sets may differ, but do not necessarily differ.

Indeed, the method comprises applying at least one patch to at least one of the one or more mathematical functions, wherein the at least one patch comprises a mathematical expression that affects the function value of the at least one patched mathematical function.

The patch comprises at least a mathematical expression that acts on the function value of the mathematical function to which it is applied and has the potential to modify it. In some examples the patch may always modify the function value while in other examples the patch may modify the function value only if certain conditions are satisfied. In the latter case, the mathematical expression may comprise a conditional statement that is evaluated before computing the function value of the patched function. The patch may also comprise a plurality of conditional statements. In case the at least one patch comprises a conditional statement, the function value of the at least one patched mathematical function may be affected only if the conditional statement is true or only if it is false. In other cases, it may be affected differently depending on the evaluation of the conditional statement.

The mathematical expression may comprise constants, variables, operations and so on. Accordingly, the modification may be constant or may depend on some varying quantities, which may at least partially belong to the input variables or not. For example, the mathematical expression may contain one or more (variable) parameters that are a subset (proper or improper) of the input variables. In this case, the mathematical expression can be evaluated once values for the input variables, which are anyway needed to evaluate the mathematical functions, are received. In another example, the mathematical expression may contain at least one parameter that does not belong to the input variables of the mathematical functions (and of the ANN). In other words, the value for this parameter is not defined by any of the input values. In this case, the mathematical expression requires also at least one patch parameter value for the parameter in order to be evaluated.

Applying a patch to a mathematical function means linking the mathematical expression of the patch and the mathematical function so that, when the mathematical function is evaluated, it is evaluated together with the mathematical expression. In other words, the patch is combined with the mathematical function to create a patched mathematical function and the function value of the patched mathematical function may differ from the function value of the "unpatched" mathematical function in virtue of the mathematical expression.

The manner of applying the patch or, said otherwise, of combining the mathematical expression with the mathematical function may take many forms, including, but not limited to, by means of mathematical operations, logical operations, comparison operations and any combination thereof. The patch may also comprise a plurality of mathematical expressions, e.g. different mathematical expressions linked to different conditions. It should be noted that the patch does not modify the parameters of the mathematical function. Indeed, the one or more mathematical functions comprise the plurality of weights of the artificial neural network, as discussed above, and the at least one patch does not modify the plurality of weights.

Figure 2:
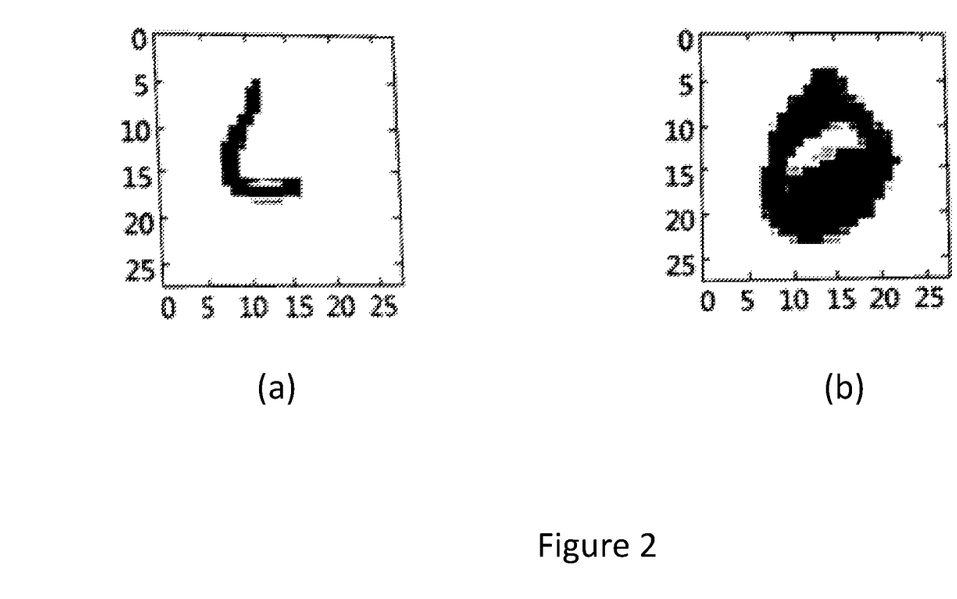
FIG. 2 shows two examples of images of handwritten digits.

For example, the patch may reduce the number of false positives by correcting the result so that no digit is recognized. This may be desirable in cases in which machine recognition fails too often. Exemplarily, this could be the case if the digits are written too small, too poorly or with a marker that is too thick. FIG. 2 shows two examples of images of handwritten digits. FIG. 2a shows a digit that is written so poorly that it cannot be reliably associated with any actual digit. One way to sort out such scribbles, so that no incorrect digit is associated with them, may be to set a threshold for the number of non-white pixels. Such a criterion would ensure that there is enough information to recognize a digit, since the non-white pixels correspond to the writing. Accordingly, the patch may be a conditional statement on the number of non-white pixels. If white corresponds to a numerical value of zero on the greyscale, and $x_i$ is the greyscale value for the i-th pixel of n pixels, the mathematical expression, i.e. the conditional statement, may be:

$$[(x_1>0)+(x_2>0)+\ldots+(x_n>0)]\geq L,$$

with L being a predetermined or predeterminable value for a lower threshold. The patch may be applied to all ten mathematical functions $f_0, \ldots, f_9$ of the illustrative example and the threshold may be different for each mathematical function, since some digits clearly require less pixels than others. Thus, the patched mathematical functions may be:

$$\{[x_1>0)+(x_2>0)+\ldots+(x_n>0)]\geq L_0\}*f_0$$

$$\{[x_1>0)+(x_2>0)+\ldots+(x_n>0)]\geq L_1\}*f_1$$

$$\{[x_1>0)+(x_2>0)+\ldots+(x_n>0)]\geq L_9\}*f_9.$$

It can be seen that the function values of the mathematical functions are left unaltered if the conditions are satisfied and are brought to zero if the conditions are not satisfied.

FIG. 2b shows a digit written with a marker too thick. In this case, the mathematical expression may be also a condition on the number of non-white pixel, but with an upper limit:

$$[x_1>0)+(x_2>0)+\ldots+(x_n>0)]\leq U.$$

Exemplarily, the mathematical expression may comprise both conditional statements, so that the resulting patched mathematical functions may be:

$$\{[(x_1>0)+(x_2>0)+\ldots+(x_n\geq 0)]\leq L_0\}*\{[(x_1>0)+(x_2>0)+\ldots+(x_n>0)]\leq U_0\}*f_0$$

$$\{[(x_1>0)+(x_2>0)+\ldots+(x_n>0)]\leq L_1\}*\{[(x_1>0)+(x_2>0)+\ldots+(x_n>0)]\leq U_1\}*f_1$$

$$\ldots$$

$$\{[(x_1>0)+(x_2>0)+\ldots+(x_n>0)]\geq L_9\}*\{[(x_1>0)+(x_2>0)+\ldots+(x_n>0)]\leq U_9\}*f_9.$$

In other examples, conditions may be set for specific pixels, e.g. depending on their position.

In some examples, only one mathematical function is associated to a patch. If there is only one mathematical function, then the mathematical function becomes a patched mathematical function. If there are more mathematical functions, then the plurality of mathematical functions comprises one patched mathematical function. In other examples, a patch may be applied to more than one mathematical function. In this case, all the mathematical functions may be patched or the plurality of mathematical functions may include a plurality of patched mathematical functions as a proper subset. The same patch may be applied to different mathematical functions or different patches may be applied to different mathematical functions, wherein some mathematical functions may have the same patch.

The specifics of the patch may be determined on the basis of information about the ANN performance and, optionally, the physical system. The information may comprise, but is not limited to, data collected by scientific experiments, simulations, previous runs of the ANN or any combination thereof. The information may additionally or alternatively comprise theoretical predictions. Generally, the information relates to a faulty behaviour of the ANN and enables a computer and/or a human being to develop the patch that addresses that faulty behaviour. Thus, the method may comprise creating the at least one patch.

Alternatively or additionally, the method may comprise retrieving the at least one patch. For example, the patch may be received by a first computing device from a second computing device, e.g. through a secure network communication, for example using encryption. Alternatively or additionally, the patch may be stored in a memory of a computing device and the memory may be accessed in order to retrieve the patch.

The method further comprises retrieving a plurality of state input values related to the physical system and computing one or more state function values by feeding the plurality of state input values to the one or more mathematical functions including the at least one patched mathematical function.

The state input values are input values as required by the ANN (and, thus, by the one or more mathematical functions) that relate to the physical system of interest. The state input values may be numerical values obtained e.g. by sensors, detectors, processing units and so on. In the illustrative example, the state input values are greyscale values referring to a specific image of a digit.

The state input values are fed to the one or more mathematical functions in order to compute one or more state function values. In other words, the one or more mathematical functions are evaluated by providing them with values for the input variables. The images of the plurality of state input values by the one or more mathematical functions are the one or more state function values. In particular, the computation of the state function values is performed after the at least one patch has been applied, so that the computation involves the evaluation of the at least one patched mathematical function, i.e. of the combination of the "original" mathematical function as derived from the ANN and the mathematical expression(s) of the patch.

In case the mathematical expression(s) of the at least one patch comprise at least one parameter that is not defined by one of the plurality of state input values, the method may further comprise retrieving at least one patch parameter value for the at least one parameter; and computing the one or more state function values comprises feeding the at least one patch parameter value to the at least one mathematical expression.

If the ANN is converted into a plurality of mathematical functions, the computation of the respective plurality of state function values may be performed in parallel. Indeed, while an ANN is run as a whole, the plurality of mathematical functions can be evaluated separately, so that the execution time may be reduced. It may also be said that the computation is executed in parallel. In this application, "perform" and "execute" are used interchangeably when referring to steps of the method or the method as a whole.

In some examples, only a subset of the one or more state function values may be computed. In other words, even if the ANN is converted into a plurality of mathematical functions, not all mathematical functions need be evaluated to obtain the detection and/or prediction. In the illustrative example, the digits may refer to e.g. handwritten binary numbers, so that only the mathematical functions for the digits 0 and 1 may be necessary.

Accordingly, the method may comprise retrieving a selection input and computing the one or more state function values may comprise computing the one or more state function values based on the selection input. In other words, the selection input may indicate a proper subset of the mathematical functions and only this subset is evaluated to obtain the state function values. The selection input may e.g. be received together with the state input values and/or from a user. The conversion of the ANN in mathematical functions may, thus, also have the advantage of saving computational time and resources, since it enables to evaluate only the pertinent part of the ANN, if it is possible to select such a pertinent part.

Further, the method comprises obtaining the detection and/or prediction from the one or more state function values. As explained above with reference to the ANN, the one or more state function values may not provide per se the detection and/or prediction about the physical system, but they do in any case determine the result. The state function values may be interpreted on the basis of one or more predetermined rules, the same used for the network output values of the ANN. In the illustrative example, the state function values are associated with the ten digits and the detection may be the digit corresponding to the highest state function value.

The prediction and/or detection about the state of the physical system may be a numerical value and/or a character string.

The detection and/or prediction may be provided to a user and/or a device, e.g. it may be displayed, transmitted via a network, stored on a portable storage device etc. In a particular example, the method may further comprise sending the plurality of state input values and the detection and/or prediction to a proxy server of a content delivery network; and storing a relation associating the plurality of state input values and the detection and/or prediction at the proxy server. The transmission may be secured by means of encryption.

Storing the relation means storing both the plurality of state input values and the detection and/or prediction in a manner that indicates that the plurality of state input values and the detection and/or prediction are associated. For example, in a relational database this would be implemented as storing them in a row. The advantage is that, if a client were to send a request with the same set of state input values, the result could be provided by the proxy server directly, instead of forwarding the request to a component configured to perform the above method and having to compute the state function values all over again. Accordingly, time and resources efficiency can be improved. In other words, the proxy server caches the detection and/or prediction so that future requests can be served faster.

In a particular example, the method may further comprise determining, based on the detection and/or prediction, one or more actions to be performed in relation to the physical system. An action may include a step that has to be taken, e.g. recharging a battery, or may include doing nothing. The determination is based on the result in that the result is used to make the determination and it is at least one of the factors dictating which action(s) should be performed. The link between the result and the corresponding action(s) may be established according to predetermined rules (e.g. a lookup table associating different values of estimated battery duration with actions such as "recharge battery", "change battery", "do nothing"). Another ANN may be used for determining the one or more actions.

The determination may also be based on other factors, including historical results, i.e. results obtained by performing the method disclosed herein at different time points in the past and stored.

The steps of the method as described above, in particular converting the artificial neural network, applying the at least one patch, computing the state function value(s), and obtaining the detection and/or prediction, may be performed in a trusted execution environment. The trusted execution environment is a part of a processor that is isolated from the rest and, thus, allows to run processes in a secure manner, preventing any access from outside the trusted execution environment. The security is implemented by a combination of hardware and software and examples of trusted execution environments include AMD's Secure Encrypted Virtualization and Intel's Trusted Execution Technology. The plaintext mathematical functions obtained from the computer file of the ANN, which is for example received as an encrypted file, can be obtained and used for obtaining the desired results without exposing them to other running processes.

Another aspect of the present invention relates to a computer program product comprising computer-readable instructions, which, when executed by a computer, cause the computer to carry out the above-described method.

Yet another aspect of the present invention relates to a computing system for obtaining a detection and/or a prediction about a state of a physical system. The computing system is configured to:
  convert a mathematical tool for machine learning into one or more mathematical functions, wherein the mathematical tool processes a plurality of input values to provide one or more output values and wherein each mathematical function maps the plurality of input values to a function value that coincides with one of the one or more output values;
  apply at least one patch to at least one of the one or more mathematical functions, wherein the at least one patch comprises at least one mathematical expression that affects the function value of the at least one patched mathematical function;
  compute one or more state function values by feeding a plurality of state input values to the one or more mathematical functions including the at least one patched mathematical function;
  obtain the detection and/or prediction from the one or more state function values.

In other words, the system is configured to implement the method described above. Exemplarily, the system may be a distributed system for implementing the computer-implemented method described above. The system may comprise at least a first, a second and a third computing component, wherein the first computing component may be configured to:
  receive, from the second computing component, a mathematical tool for machine learning, wherein the mathematical tool processes a plurality of input values to provide one or more output values;
  convert the mathematical tool into one or more mathematical functions, wherein each mathematical function maps the plurality of input values to a function value that coincides with one of the one or more output values;
  receive, from the second computing component, at least one patch;
  apply the at least one patch to at least one of the one or more mathematical functions, wherein the at least one patch comprises at least one mathematical expression that affects the function value of the at least one patched mathematical function;
  receive, from the third computing component, a plurality of state input values related to the physical system;
  compute one or more state function values by feeding the plurality of state input values to the one or more mathematical functions including the at least one patched mathematical function;
  obtain the detection and/or prediction from the one or more state function values;
  send, to the third computing component, the detection and/or prediction.

In this system, the first computing component acts as an intermediary between the second computing component and the third computing component. Indeed, the second computing component is configured to send the ANN and the at least one patch to the first computing component and the third computing component is configured to send the state input values to the first computing component and to receive the detection and/or prediction from the first computing component.

The second computing component may belong to a provider company that has developed an ANN algorithm and corresponding one or more patches, e.g. for predicting battery discharge, and the third computing component may belong to a consumer company that employs and/or produces battery-powered devices, such as drones. The provider company may not want to disclose the ANN algorithm and the patches to any consumer company and the consumer company may want to keep physical system-related data confidential. This can be achieved by using the first computing component as "middle man" and using secure communication channels. In other words, the first computing component may communicate with both the second computing component and the third computing component, while the second computing component and the third computing component do not communicate with each other and do not know about each other. The first computing component may further comprise a trusted execution environment, as explained above. In this way, the first computing component becomes a trustworthy service provider for both the other two computing components, wherein the rest of the first computing component does not have access to the sensitive data received. Accordingly, the computing system, in virtue of the characteristics of the computing components, the distribution of roles and the communication paths, accomplishes security and efficiency while allowing for confidentiality as well.

The first computing component may further allow access to the mathematical functions and the patch to a third party, such as a certification agency.

In another example, the tasks may be assigned differently to the three computing components. In particular,
  the first computing component may be configured to:
    send, to the second computing component, a computer program for converting the mathematical tool;
  the second computing component may be configured to:
    convert, using the computer program, the mathematical tool and apply the at least one patch;
    send, to the first computing component, the one or more mathematical functions including the at least one patched mathematical function; and
  the first computing component may be further configured to:
    receive, from the third computing component, the plurality of state input values;
    compute the one or more state function values and obtain the detection and/or prediction; and
    send, to the third computing component, the detection and/or prediction.

Accordingly, in this example, the conversion of the mathematical tool such as the ANN is performed at the second computing component by using a computer program, e.g. a script, received from the first computing component. Thus, the computer file(s) specifying the ANN do not leave the second computing component. Apart from this difference, also in this case the first computing component acts as middle man, as explained above.

The components of the system can be interconnected by any form or medium of digital data communication (e.g., a communication network). Examples of communication networks include a local area network (LAN), a wide area network (WAN), and the Internet. The communications may be secure, e.g. by means of encryption. Exemplarily, the first computing component may be configured to encrypt the result before sending it to the third computing component, possibly via a proxy server; the second computing component may be configured to encrypt the artificial neural network and the at least one patch before sending them to the first computing component; and the third computing component may be configured to encrypt the state input values before sending them to the first computing component.

Each computing component may, according to the specific operation or situation, act as client or server. The relationship of client and server arises by virtue of computer programs running on the respective components and having a client-server relationship to each other.

A computing component, in particular the first computing component, may provide a cloud computing environment. Alternatively, a computing component may provide an on-premises computing environment.

In cases in which the at least one mathematical expression of the at least one patch comprises at least one parameter that is not defined by one of the plurality of state input values, as discussed above, the first computing component may be further configured to receive, from the third computing component, at least one patch parameter value for the at least one parameter; and the first computing component may be configured to feed the at least one patch parameter value to the at least one mathematical expression in order to compute the one or more state function values.

In the case of a plurality of mathematical functions, the first computing component may be further configured to evaluate the plurality of mathematical functions in parallel. For example, the computations may be performed on different processors or on different virtual machines.

In a particular example, the system may further comprise a proxy server of a content delivery network and the transmission of the result from the first computing device to the second computing device may occur via the proxy server. In this case, the first computing component may be further configured to send the plurality of state input values and the result to the proxy server and the proxy server may be configured to send the result to the third computing component. Further, the proxy server may be configured to store a relation associating the plurality of state input values and the result.

In a further particular example, the third computing component may be configured to determine, based on the result, one or more actions to be performed on the physical system.

Exemplarily, the system may comprise a plurality of second computing components and/or a plurality of third computing components, each of them configured to communicate with the first computing component.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD_ROM and DVD-ROM disks. The processor and the memory can be supplemented by, or incorporated in special purpose logic circuitry.

The invention can be implemented in a computing system that includes a back_end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

FIG. 1 (upper part) shows a schematic representation of an artificial neural network, which comprises a plurality of nodes or neurons and connections between the neurons, each connection providing the output of a neuron as input to another neuron. In particular, the inputs are assigned weights, as also shown in FIG. 1. The left-most layer is the input layer and receives the external data, i.e. the plurality of input values, and the right-most layer is the output layer. The layer in the middle is the hidden layer. FIG. 1 only shows a simple example to illustrate the structure of an ANN, however the ANNs discussed in the present disclosure are not limited to this example.

ANNs and machine learning find application in several different fields, ranging from cybersecurity to aerospace, from transports to healthcare. Often the developers of an ANN do not coincide with the consumers, i.e. those actually employing the ANN. According to the present disclosure, a secure interface between developers and consumers is provided.

Figure 3:
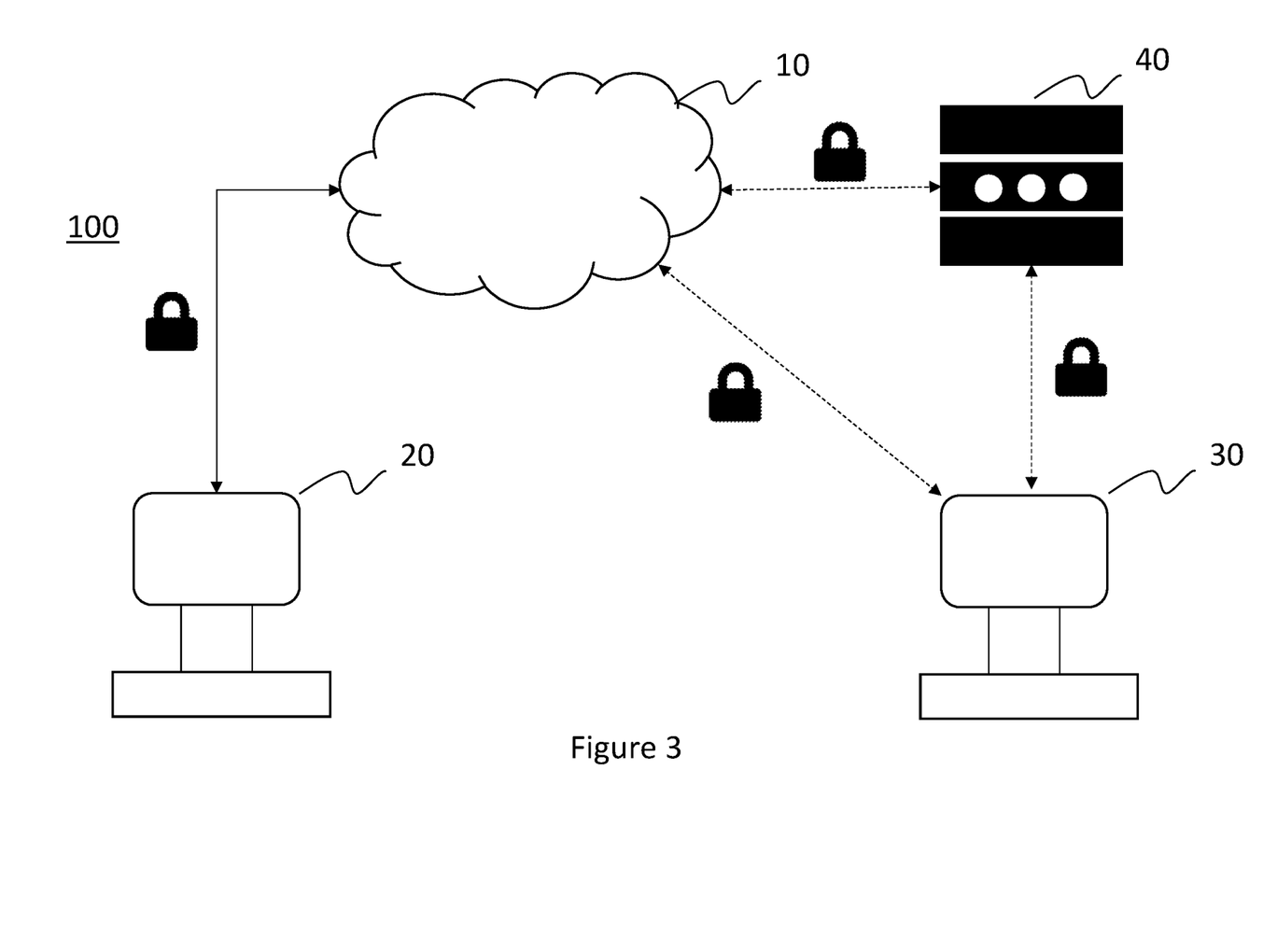
FIG. 3 shows a block diagram of a system for obtaining a result providing a detection and/or a prediction about a physical system according to an example.

FIG. 3 shows a block diagram of a system 100 for obtaining a result providing a detection and/or a prediction about a physical system according to an example.

The system 100 comprises a first computing component 10, a second computing component 20 and a third computing component 30. In particular, the first computing component 10 may be a cloud computing environment, while the second and third computing components 20, 30 may be on-premises computing environments.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment (i.e., cloud environment or cloud) may have one or more of the following characteristics: scalability, multitenancy, performance monitoring, virtual resources that are dynamically assignable to different users according to demand, multiple redundant sites, multiple virtual machines, as well as network accessibility (e.g., via. the Internet) from multiple locations (e.g., via a web browser) and devices (e.g., mobile device or PC).

In comparison to an on-premises computing environment, the cloud computing environment may have a higher ratio of virtual resources to physical resources (e.g., a higher ratio of virtual machines to physical machines). For example, the ratio of virtual resources (e.g., machines) to physical resources may be at least 10:1, at least 20:1 or at least 30:1 in the cloud computing environment. In contrast, an on-premises computing environment may have less than four virtual resources (e.g., machines) per physical resource.

Figure 5:
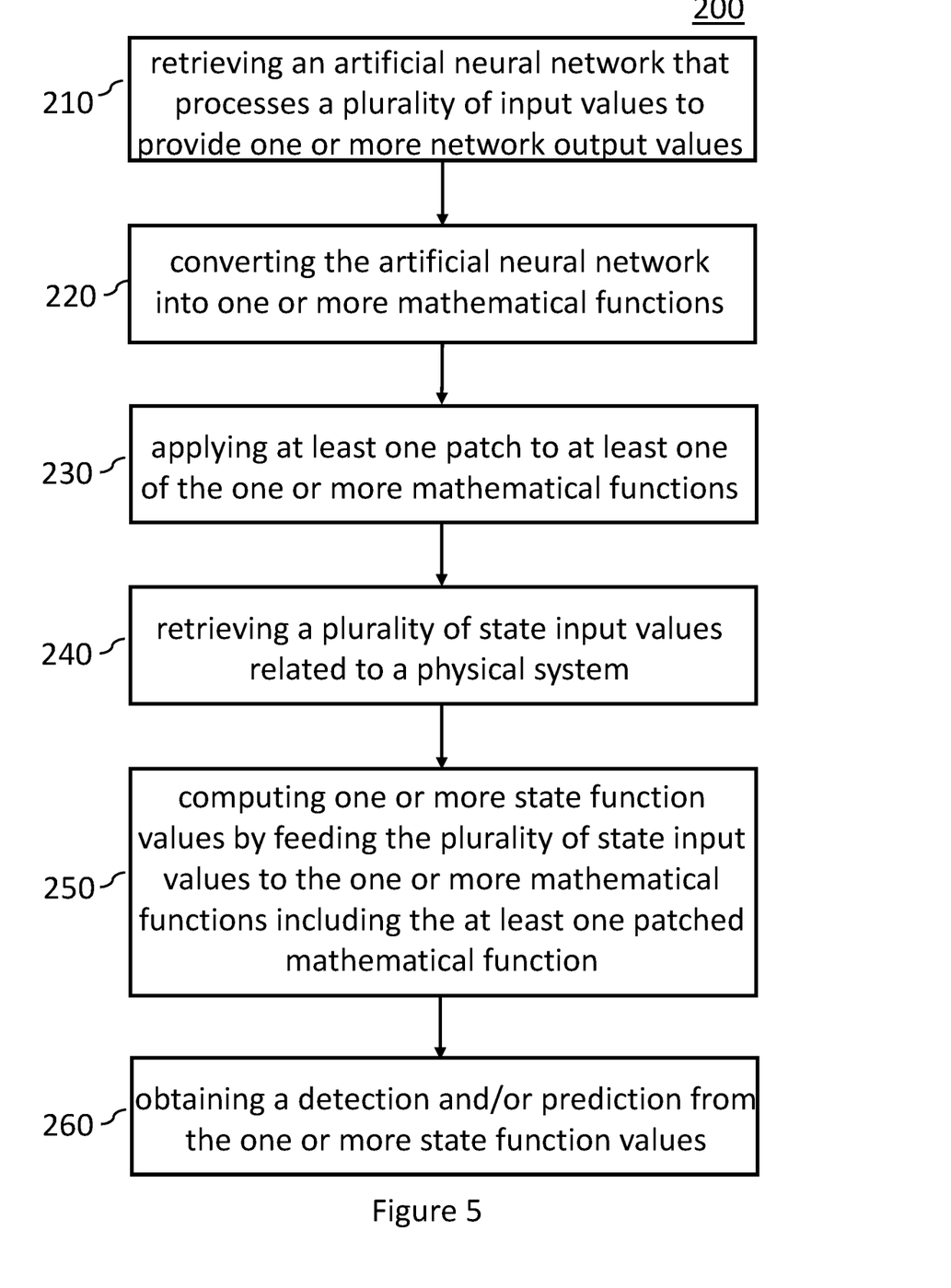
FIG. 5 shows a flow chart of a method for obtaining a result providing a detection and/or a prediction about a physical system according to an example.

The service provided by the first computing component 10 according to the method shown in FIG. 5 may be provided using an application programming interface (API), e.g. a representational state transfer (REST) API. The service may use and/or rely on any of the following tools: Golang, Kyma, JavaScript Node.js, Istio, Kubernetes, Docker, Google Cloud Platform, Azure, Swagger, paceval. In particular, the latter is a computational software module that enables fast and accurate computation of the mathematical functions. The first computing component 10 may comprise a trusted execution environment. In this case, the data and applications running within the trusted execution environment are not accessible to the cloud service provider, guaranteeing security and confidentiality.

The communications between the computing components are made secure by means of encryption. In some examples, the communication between the first computing component 10 and the third computing component 30 may be direct, in other examples it may occur via a proxy server 40, e.g. one belonging to a content delivery network.

The first computing component 10 acts as intermediary between the second computing component 20 and the third computing component 30. The first computing component 10 receives the ANN and the patch from the second computing component 20 and uses them with input values received from the third computing component 30 in order to provide the third computing component 30 with a detection and/or prediction about the state of a physical system.

Figure 4:
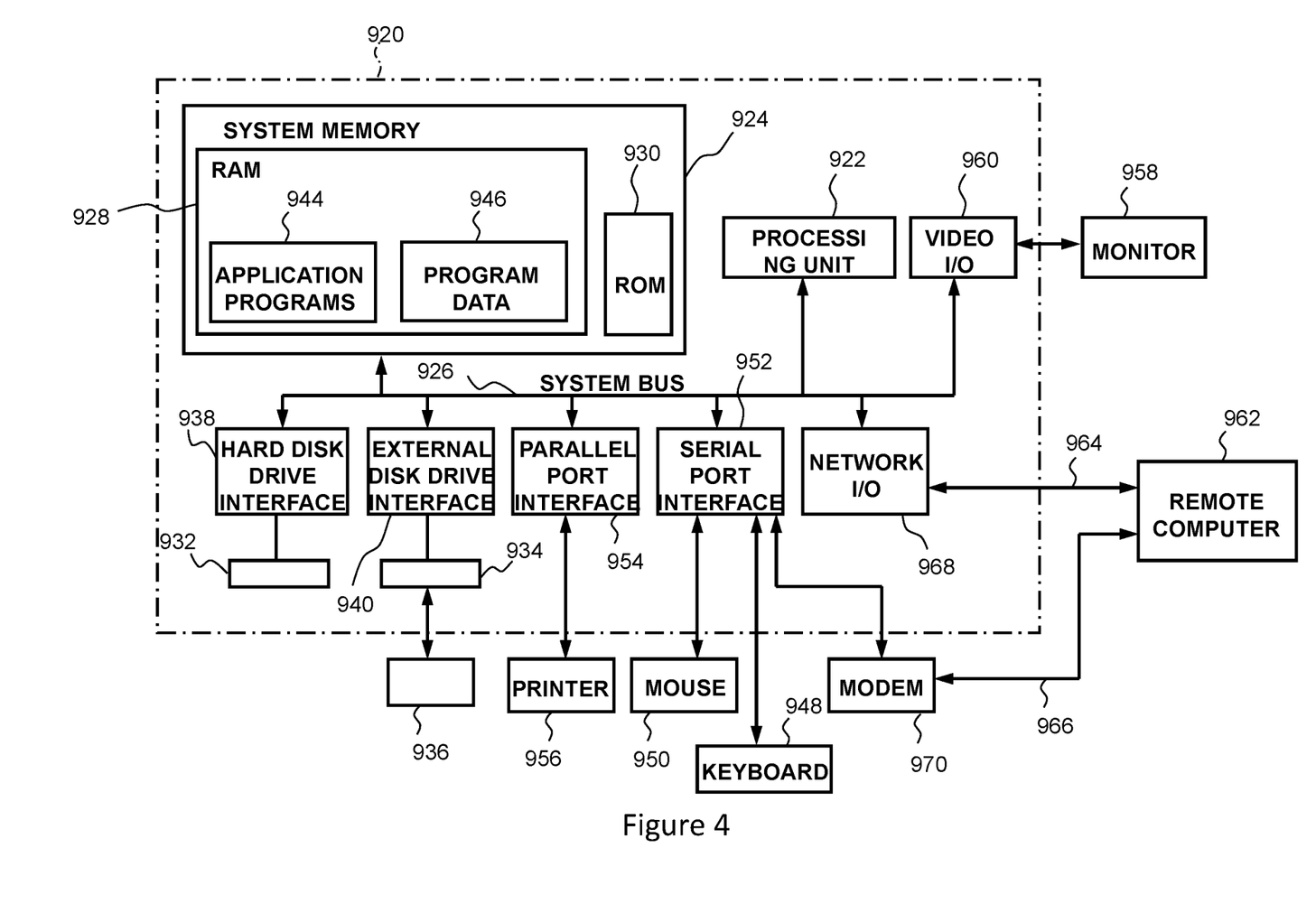
FIG. 4 shows an exemplary computing component.

FIG. 4 shows an exemplary general purpose computing component in the form of an on-premises computing environment 920 (e.g. a personal computer). The computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIG. 5.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. In a networked environment, program modules depicted relative to the computing environment 920, or portions thereof, may be stored in a remote memory storage device resident on or accessible to remote computer 962. It will be appreciated that the network connections shown are exemplary and other means of establishing a communications link between the electronic devices may be used.

FIG. 5 shows a flow chart of a method for obtaining a detection and/or a prediction about a physical system according to an example.

The method according to this example comprises retrieving 210 an artificial neural network that processes a plurality of input values to provide one or more network output values. The ANN may be retrieved by the first computing component 10 from the second computing component 20 of FIG. 3. The transmission of the ANN may be initiated by the first computing component 10 or by the second computing component 20. The first computing component 10 may store the ANN in a storage unit and retrieve it from the storage unit when it is needed. In particular, the second computing component 20 may send a file containing the source code of the ANN to the first computing component 10.

The ANN may be an ANN trained for providing predictions about the status of a battery, in particular the amount of charge remaining in the battery, the so-called State-of-Charge (SOC). Accordingly, the plurality of input values processed by the ANN may be values defining the following quantities: resistance, voltage, current, battery temperature, environment temperature. The ANN may provide one network output value indicating the SOC.

At 220 the ANN may be converted into one or more mathematical functions, wherein each mathematical function maps the plurality of input values to a function value that coincides with one of the one or more network output values. The first computing component 10 may run a program that converts the source code of the ANN into plain text mathematical functions. The program may "read" from the source code file the values of the weights, the form of the propagation function of the ANN and how the nodes are connected (e.g. from a control flow loop) and combine these pieces of information to obtain a plain mathematical function having the weights and, possibly, the biases as parameters and the input quantities as variables. In other words, the method may comprise extracting one or more mathematical functions from the ANN source code.

In the SOC example, the ANN may be converted into one mathematical function, which, evaluated by giving values to the input quantities, gives as function value the network output value that the ANN would give.

Then, at 230, at least one patch is applied to at least one of the one or more mathematical functions. The first computing component 10 may receive the patch from the second computing component 20 or from a different source, wherein the patch is based on insight about the physical system and the performance of the ANN. The patch includes a mathematical expression that is combined with the mathematical function so that the mathematical function is evaluated together with the mathematical expression and the function value is, thus, determined by the combination and not only by the mathematical function. In other words, a patched mathematical function is created by applying the mathematical expression to the mathematical function. The patch never modifies the parameters (weights and biases) of the mathematical function. In other words, the patch does not modify directly the terms of the mathematical function but rather only affects its output, the function value. In this way, the original mathematical function is always recognizable in the patched mathematical function.

In the SOC example, as explained, the mathematical function provides a prediction about the SOC. This mathematical function $f_{soc}$ may come from an ANN that has been trained on new batteries, i.e. batteries that have not substantially been used yet. However, with every recharge cycle, the capacity of the battery diminishes and may differ from a nominal value. The patch may be then a mathematical expression that takes into consideration usage data of the battery, e.g. a mathematical expression comprising one or more conditional statements that depend on the usage and that associate a numerical factor between 0 and 1 to different usage stages. The patch $g_{usage\_data}$ may e.g. have the following form: $g_{usage\_data} = (rc \leq th) + (rc > th) * cf$, with rc the number of recharge cycles already performed on the battery, th a predetermined or predeterminable numerical threshold and cf a correction factor. The patched function may then be $g_{usage\_data}*f_{SOC}$. The patch may also comprise a plurality of different conditional statements associated to different thresholds with corresponding correction factors.

An additional or alternative refinement of the mathematical function may involve considerations about the manufacturing process of the battery. For example, a producer may change the manufacturing process in order to optimize the battery, while the ANN was trained on data coming from batteries produced with the old process. The patch $h_{manufacturing\_data}$ may be a constant numerical value greater than 1 to be applied for all batteries produced with the new manufacturing process. The patched function may then be $h_{manufacturing\_data}*f_{SOC}$. If both refinements are considered, the patch will be $h_{manufacturing\_data}*g_{usage\_data}$.

Both the mathematical function(s) and the patch may comprise any of the following mathematical symbols: basic operators (e.g. +, −, *, /), logic operators (e.g. NOT, AND, OR, XOR, NAND, XNOR), comparison operators (e.g. >, <, =, >=, <=, < >), parentheses, numerical constants (e.g. e, pi), factorials (e.g. !, fac), exponents or roots (e.g. ^, sqr, sqrt, exp), trigonometrical, hyperbolic, logarithmic, sigmoidal functions (e.g. lg, ln, sig, sin, cos, tan, cot, asin, acos, atan, acot, sinh, cosh, tanh, coth, arsinh, arcosh, artanh, arcoth), numerical manipulation (e.g. sgn, abs, round, ceil, floor). In particular, the mathematical function(s) and the patch may be closed-form expressions.

The patch provides an efficient and targeted fix that improves the detection and/or prediction that would be obtained from the ANN without a need to retrain the ANN. Further, another advantage of avoiding a re-training or any other computationally expensive modification of the ANN relates to certifications.

Machine learning algorithms must meet certain requirements as established e.g. by governments or supranational entities. Usually the evaluation of an ANN to established whether the requirements are satisfied may take up to 18 months. Even a small modification in one of the parameters may affect the outcome of the ANN in many not-straightforward ways, so that a modified ANN needs to undergo the lengthy certification process once again. As explained, the patch can adjust the function value and, thus, the detection and/or prediction which is obtained from it, without changing the parameters of the mathematical function as derived from the ANN. Further, both the mathematical functions making up the ANN and the patch are human readable mathematical expressions. Accordingly, the effect on the detection and/or prediction introduced by the patch can be more easily isolated and identified, so that the certification process does not require a complete re-evaluation of the whole ANN, rather only of the patch. Thus, the time required to obtain a certification may be substantially reduced.

The patch may comprise a mathematical expression that is a conditional statement, so that the function value is modified to zero if the condition holds false and remains unmodified if the condition holds true. In another example, the patch may comprise a mathematical expression having a patch function linked to a condition, so that the patch function is only evaluated if the condition holds true. For example, there may be a conditional statement relative to the environment temperature, e.g. checking whether the environment temperature is higher than a given threshold. This would mean that the function value is only modified by the patch function if the environment temperature exceeds the threshold.

At 240 state input values related to the physical system are retrieved. The state input values are the values required as input by the mathematical functions, which are nothing else than the values required as input by the ANN that has been converted in the mathematical functions. In the SOC example, the state input values are values for the resistance, voltage, current, battery temperature, environment temperature. The state input values may be directly measured from the battery or raw data may be extracted from battery and then processed to become state input values.

The state input values may be received from the third computing component 30. The third computing component 30 may be a computing device configured to control an unmanned aerial vehicle (UAV), which can be used in a wide range of applications, such as traffic control, delivery services and rescue missions. A wrong prediction about how much time the UAV can be operated before landing for recharging can have dire consequences, so that accuracy in predicting the SOC is crucial.

The third computing component 30 may be connected to any measuring devices (such as sensors) and/or any processing devices that can provide the state input values.

At 250 one or more state function values are computed by feeding the plurality of state input values to the one or more mathematical functions including the at least one patched mathematical function. In other words, the one or more mathematical functions are evaluated using the state input values for the function variables, thereby producing one or more numerical values, the state function values. In the SOC case, there is only one mathematical function, and this mathematical function has been patched. If the patch comprises the condition about the environment temperature, the state function value will be a number equal to the network output value that the ANN would output for the same state function values if the temperature is below the threshold. If the temperature is above the threshold, the state function value will differ from the corresponding network output value. The differing state function values constitutes a correction to the network output value and provides a more accurate prediction of the SOC.

Indeed, at 260, the detection and/or prediction about the state of the physical system is obtained from the one or more state function values. The one or more state function values may already constitute the detection and/or prediction or may need to be processed and/or interpreted to arrive at the detection and/or prediction. The state function value for the SOC example may be e.g. a number indicating the estimated time before discharge in minutes. In this case the state function value coincides with the prediction.

The prediction about the duration of the battery may be sent to the third computing component 30, which may determine one or more actions to be performed in relation to the physical system. For example, the third computing component 30 may determine that the UAN needs to land in order to recharge the battery.

The method illustrated above provides an efficient way of improving the accuracy of an ANN without directly modifying the ANN and may be applied to obtain a detection and/or prediction about a state of a physical system in several different fields. Other applications besides the SOC for a battery include, for example, prediction of deterioration in mechanical components such as rail wheels or textile machines and voice and emotion recognition.

What is claimed is:

1. A computer-implemented method for obtaining a detection and/or a prediction about a state of a physical system, the method comprising:
    retrieving, from a memory of a computing device, a mathematical tool for machine learning, wherein the mathematical tool processes a plurality of input values to provide one or more output values;

converting the mathematical tool into one or more mathematical functions in a plain text format, wherein each mathematical function maps the plurality of input values to a function value that coincides with one of the one or more output values;

applying at least one patch to at least one of the one or more mathematical functions via at least one of mathematical operations, logical operations, and comparison operations, wherein the at least one patch comprises at least one mathematical expression comprising at least one constant, at least one variable and at least one operator, and the mathematical expression affects the function value of the at least one patched mathematical function;

retrieving a plurality of state input values related to the physical system;

computing one or more state function values by feeding the plurality of state input values to the one or more mathematical functions including the at least one patched mathematical function; and obtaining the detection and/or prediction from the one or more state function values;

wherein the computer implementing the method comprises a first, a second and a third computing component, and the method further comprises the first component:

receiving, from the second computing component, the mathematical tool and the at least one patch;

converting the mathematical tool and applying the at least one patch;

receiving, from the third computing component, the plurality of state input values;

computing the one or more state function values and obtaining the detection and/or prediction;

sending, to the third computing component, the detection and/or prediction; and controlling an unmanned aerial vehicle based on the detection and/or prediction.

2. The computer-implemented method of claim 1, wherein the mathematical tool is an artificial neural network.

3. The computer-implemented method of claim 2, wherein the mathematical expression of the at least one patch comprises a conditional statement.

4. The computer-implemented method of claim 1, wherein the method is performed in a trusted execution environment.

5. The computer-implemented method of claim 1, wherein the one or more mathematical functions comprise a plurality of mathematical functions and computing the plurality of state function values comprises evaluating the plurality of mathematical functions in parallel.

6. The computer-implemented method of claim 1, further comprising:

sending the plurality of state input values and the detection and/or prediction to a proxy server of a content delivery network;

storing a relation associating the plurality of state input values and the detection and/or prediction at the proxy server; and determining, based on the detection and/or prediction, one or more actions to be performed in relation to the physical system.

7. The computer-implemented method of claim 2, wherein the one or more mathematical functions comprise a plurality of weights of the artificial neural network and the at least one patch does not modify the plurality of weights.

8. A computing system for obtaining a detection and/or a prediction about a state of a physical system, the computing system comprising a first, a second and a third computing component, the computing system being configured to:

convert a mathematical tool for machine learning into one or more mathematical functions, wherein the mathematical tool processes a plurality of input values to provide one or more output values and wherein each mathematical function maps the plurality of input values to a function value that coincides with one of the one or more output values;

apply at least one patch to at least one of the one or more mathematical functions, wherein the at least one patch comprises at least one mathematical expression comprising at least one constant, at least one variable and at least one operator, and the mathematical expression affects the function value of the at least one patched mathematical function;

compute one or more state function values by feeding a plurality of state input values to the one or more mathematical functions including the at least one patched mathematical function; and obtain the detection and/or prediction from the one or more state function values;

wherein the first computing component is configured to:

receive, from the second computing component, the mathematical tool and the at least one patch;

convert the mathematical tool and apply the at least one patch;

receive, from the third computing component, the plurality of state input values;

compute the one or more state function values and obtain the detection and/or prediction;

send, to the third computing component, the detection and/or prediction; and control an unmanned aerial vehicle based on the detection and/or prediction.

9. The system of claim 8, wherein the mathematical tool is an artificial neural network.

10. A computing system for obtaining a detection and/or a prediction about a state of a physical system, wherein the system comprises a first, a second and a third computing component, the computing system configured to:

convert a mathematical tool for machine learning into one or more mathematical functions, wherein the mathematical tool processes a plurality of input values to provide one or more output values and wherein each mathematical function maps the plurality of input values to a function value that coincides with one of the one or more output values;

apply at least one patch to at least one of the one or more mathematical functions, wherein the at least one patch comprises at least one mathematical expression comprising at least one constant, at least one variable and at least one operator, and the mathematical expression affects the function value of the at least one patched mathematical function;

compute one or more state function values by feeding a plurality of state input values to the one or more mathematical functions including the at least one patched mathematical function;

obtain the detection and/or prediction from the one or more state function values; and wherein the first computing component is configured to:
send, to the second computing component, a computer program for converting the mathematical tool;
the second computing component is configured to:
convert, using the computer program, the mathematical tool and apply the at least one patch; and
send, to the first computing component, the one or more mathematical functions including the at least one patched mathematical function; and
the first computing component is further configured to:
receive, from the third computing component, the plurality of state input values;
compute the one or more state function values and obtain the detection and/or prediction;
send, to the third computing component, the detection and/or prediction; and
control an unmanned aerial vehicle based on the detection and/or prediction.

11. The system of claim 10, wherein the first computing component comprises a trusted execution environment.

12. The system of claim 11, wherein the one or more mathematical functions comprise a plurality of mathematical functions and the first computing component is configured to compute the plurality of state function values by evaluating the plurality of mathematical functions in parallel.

13. The system of claim 12, further comprising a proxy server of a content delivery network, wherein the first computing component is further configured to send the plurality of state input values and the detection and/or prediction to the proxy server; and
the proxy server is configured to:
send the detection and/or prediction to the third computing component; and
store a relation associating the plurality of state input values and the detection and/or prediction;
wherein the third computing component is configured to determine, based on the detection and/or prediction, one or more actions to be performed in relation to the physical system.

14. A computer program product comprising computer-readable instructions, which, when executed by a computer, cause the computer to:
retrieve a mathematical tool for machine learning, wherein the mathematical tool processes a plurality of input values to provide one or more output values;
convert the mathematical tool into one or more mathematical functions, wherein each mathematical function maps the plurality of input values to a function value that coincides with one of the one or more output values;
apply at least one patch to at least one of the one or more mathematical functions, wherein the at least one patch comprises at least one mathematical expression comprising at least one constant, at least one variable and at least one operator, and the mathematical expression affects the function value of the at least one patched mathematical function;
retrieve a plurality of state input values related to a physical system;
compute one or more state function values by feeding the plurality of state input values to the one or more mathematical functions including the at least one patched mathematical function; and
obtain a detection and/or prediction from the one or more state function values;
wherein the computer comprises a first, a second and a third computing component, and the first computing component is configured to:
receive, from the second computing component, the mathematical tool and the at least one patch;
convert the mathematical tool and apply the at least one patch;
receive, from the third computing component, the plurality of state input values;
compute the one or more state function values and obtain the detection and/or prediction;
send, to the third computing component, the detection and/or prediction; and
control an unmanned aerial vehicle based on the detection and/or prediction.

15. The computer program product of claim 14, wherein the mathematical expression of the at least one patch comprises a conditional statement.

16. The computer program product of claim 14, wherein the one or more mathematical functions comprise a plurality of mathematical functions and computing the plurality of state function values comprises evaluating the plurality of mathematical functions in parallel.

17. The computer program product of claim 14, comprising computer-readable instructions, which, when executed by a computer, cause the computer to:
send the plurality of state input values and the detection and/or prediction to a proxy server of a content delivery network;
store a relation associating the plurality of state input values and the detection and/or prediction at the proxy server; and
determine, based on the detection and/or prediction, one or more actions to be performed in relation to the physical system.

18. The computer program product of claim 14, wherein the one or more mathematical functions comprise a plurality of weights of an artificial neural network and the at least one patch does not modify the plurality of weights.

* * * * *